EDITING SYSTEM UTILIZING RECIRCULATION MEANS

Filed July 16, 1963

INVENTOR
JAMES N. COOPER

BY Hurvitz & Rose
ATTORNEYS

3,360,613
EDITING SYSTEM UTILIZING RECIRCULATION MEANS

James N. Cooper, Hyattsville, Md., assignor of one-third to Hyman Hurvitz, Washington, D.C.
Filed July 16, 1963, Ser. No. 295,436
5 Claims. (Cl. 179—100.2)

ABSTRACT OF THE DISCLOSURE

A dictation tape recorder, employing an endless tape, and three tape feeds which are independently actuable. A first tape storage bin subsists between the first and second of the tape feeds, and a second tape storage bin between the second and third feeds. Recording takes place as the first feed forces the tape into the first bin and reproduction as the tape is pulled out of the first bin and fed into the second bin. Reproduction also takes place as the tape is fed from the second bin back to the first bin, and reproduced signals can be fed back into the record head. A further tape recorder is provided having its own tape, to which signal can be transferred from the last named reproduction.

Figures 1, 2:
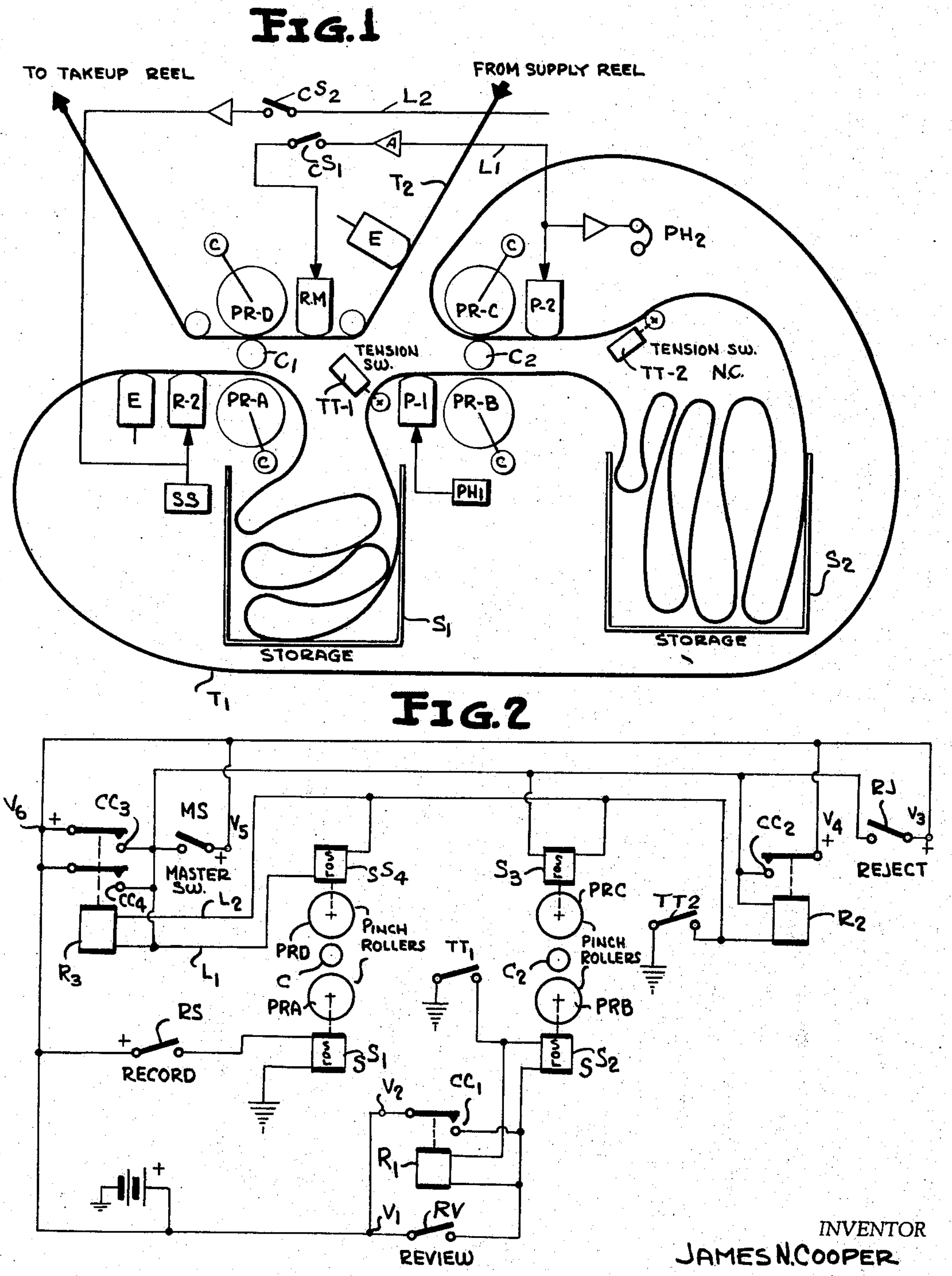

The present invention relates generally to magnetic tape recorders and more particularly to magnetic tape recorders having provision for editing.

The problem arises, when inserting material into a tape recorder, of editing the recorded material, i.e., of inserting additional material into the recording or deleting material from the recording, or both, at will, at any position therein. The inserted material may derive from a microphone, in the course of dictation, or it may derive from an independent tape recorder. In either case the material is originally available as an electrical signal and its source is herein denominated a "signal source."

According to the invention, briefly described, an endless tape is employed as an editing medium. This tape is fed between a first capstan and electrically actuated pinch roller to a first storage. The first storage is provided with a device, specifically a normally closed switch, for sensing by its opening the condition of empty storage, since in this condition the tape is taut. A record head is provided for introducing material to the tape just preceding the first pinch roller. Closure of a "record" switch, at will, feeds tape past the record head into the first storage and material can be recorded thereon in the process. The tension switch closes as soon as the record process commences, to signal that the tape is slack.

A section of tape, when recorded and stored in the first storage, has its initial point positioned immediately adjacent a second capstan and electrically actuated pinch roller and a reproduce head. A manually operative "review" switch is then closed, actuating the last mentioned pinch roller, and feeding the tape from the first storage to a second storage. In the process the contents of the tape may be monitored, to determine whether or not it is satisfactory. When the first storage is emptied, its tension switch senses this fact by opening, and by so doing disables the last mentioned pinch roller.

A further tape recorder is provided, for recording acceptable material. If the recorded material in the second storage is found acceptable, on review, a "master" switch is actuated, which energizes the further tape recorder and also a tape feed for feeding the tape out of the second storage past a second reproduce head, and back to the record head in readiness for re-use. The second reproduce head at the second tape drive provides the signal for the further tape recorder.

If the material reviewed is not acceptable, a "reject" switch is closed, which feeds the tape out of second storage into position for re-use at the first record head, but does not actuate the further tape recorder, so that the material is not re-recorded.

By providing material of only a few seconds duration, at each operation, for example, a sentence or two, a large mass of material can be edited, by discarding what is unsuitable and inserting replacement, as desired, at the record head. If a tape is to be edited, the signal source may include the output of a reproducer, and a microphone may be included in the signal source for effecting insertions.

The possibility exists of recording into the first storage a large mass of material, perhaps fifteen minutes of dictation. In such case editing can be effected by feeding recorded signal material back from the last reproducer into the first record head. The process requires initial transfer of all the recorded material into the second storage, and then re-transferring to the first storage, which leaves the record head available for signal insertion while in process of transferring tape from the second storage back to the first. Material may be deleted by failing to reproduce same during transfer of the tape from the second storage to the first storage. The process of editing above briefly outlined can be repeated until a perfect tape is achieved, whereupon the latter may be reproduced into permanent form on a master tape.

Counters secured to the pinch rollers may be employed to facilitate manual feed back of tape to compensate for roller spacings over feeds, and the like.

It is, accordingly, a broad object of the invention to provide a novel editing system for tape recorders.

It is another object of the invention to provide a tape editing system employing an editing tape which feeds tape only in a single direction, and never reverses tape feed.

A further object of the invention resides in the provision of a tape recorder having two identically driven capstans and two pinch rollers for each capstan.

Another object of the invention resides in the provision of a tape machine employing an endless tape and having two tape storages, the first following a record station and preceding a reproduce station, and the second following the reproduce station preceding the record station.

It is another object of the invention to provide an editing system capable of reviewing small sections of information for suitability, and transferring to a master tape of each section if suitable, and discarding if not.

A further object of the invention resides in the provision of a tape recorder having only a unidirectional tape drive, and having provision for insertion or deletion of material into a recording without leaving gaps.

The above and still further objects, features and advantages of the present invention will become apparent upon consideration of the following detailed description of one specific embodiment thereof, especially when taken in conjunction with the accompanying drawings, wherein:

FIGURE 1 is a diagrammatic representation of the physical arrangement and facilities of the tape editing system of the present invention; and FIGURE 2 is a schematic circuit diagram of the system of FIGURE 1.

Referring now to FIGURE 1, $T_1$ is an endless tape, which feeds past an erase head E, a record head R–2, provided with a signal source SS, a capstan $C_1$ and a pinch roller PR–A. Following capstan $C_1$ is a loop storage $S_1$ for recorded tape.

Following pinch roller PR–A is a reproduce head P–1 provided with review phones PH1, and a capstan $C_2$ and pinch roller PR–B. When the latter is operated recorded tape is withdrawn from storage $S_1$ and its contents reviewed at phones PH1. A normally closed tape tension switch TT–1, is so located as to open when the tape between pinch rollers PR–A and PR–B is taut, i.e., when loop storage $S_1$ is empty.

Following pinch roller PR–B is a further loop storage $S_2$, from which the tape proceeds to a further pinch roller PR–C, cooperating with capstan $C_2$. The pinch roller PR–C pulls tape past a reproduce head $P_2$. The tape $T_1$ then loops back to erase head E.

The capstan $C_1$ may be used to provide drive in conjunction with a pinch roller PR–D, for a master tape $T_2$, pulling the latter past an erase head EE and a master record head RM, in that order. The tape $T_2$ may proceed from a supply reel to a take-up reel (not illustrated) in conventional fashion. Emptying of storage $S_2$ may be sensed by opening of normally closed tension switch $TT_2$.

A signal transfer loop $L_1$ exists between reproduce head $P_2$ and master record head R–M, and a further signal transfer loop $L_2$ exists between reproduce head $P_2$ and record head R–2. The loops may be opened or closed at will by control switches $CS_1$ and $CS_2$, respectively. Amplifiers A are provided as required in the several signal channels, to provide gain and/or isolation.

Two modes of operation are envisaged. In one, small lengths of information, say one or two sentences, are supplied from signal source SS, via record head R–2, to tape $T_1$ and the recorded tape stored in storage $S_1$. The tape is then fed out of storage $S_1$ past reproduce head P–1 and reviewed by phones PH1, while the length of recorded tape is fed into storage $S_2$. Switches $CS_1$ and $CS_2$ are open during the above described operation. If the material in storage $S_2$ is suitable, switch $CS_1$ is closed and pinch rollers PR–C and PR–D energized, transferring the recorded material to master tape $T_2$. If not switch $CS_1$ is opened and tape in storage $S_2$ fed out ready for re-use, by energizing pinch roller PR–C but not PR–D.

In an alternative mode of use of the system, a large mass of material may be recorded from signal source SS onto tape $T_1$, and the recorded tape stored in storage $S_1$. The recorded tape may then be fed into storage $S_2$, either rapidly if it is not to be reviewed, or slowly, if it is to be reviewed.

During review the necessity for correction may become apparent. The tape is now fed out of storage $T_2$, reproduced by head $P_2$ and monitored by phones $PH_2$. The information from head $P_2$ is fed back, via now closed switch $CS_2$ to record head $R_2$. In order to erase any portion of the material, switch $CS_2$ may be opened, while pinch roller PR–C is energized and pinch roller PR–A is de-energized. In order to insert new material, pinch roller PR–C is de-energized and pinch roller PR–A energized, and the material to be inserted supplied to record head $R_2$ from signal source SS, which may be or include a microphone.

By means of one or more editing operations, as above described, a perfect tape may be achieved. The latter may be transferred to master tape $T_2$, as and when desired, in the course of the editing operation.

In order to render the operation of the present system semi-automatic, the control system of FIGURE 2 may be employed.

Record switch RS may be closed manually and energizes solenoid $SS_1$, actuating pinch roller PR–A during a record operation. At this time a signal may be inserted via SS. Switch $TT_1$, open at initiation of an operation, since tape $T_1$ is then taut, is closed as soon as tape $T_1$ commences to feed into storage $S_1$. When a sufficient length of material is recorded, review switch RV is closed. Relay $R_1$ is thus energized, from + terminal $V_1$ through switch $TT_1$ to ground. The relay $R_1$ is locked energized, the circuit being $V_2$, contacts $CC_1$, to tension switch $TT_1$ and ground. A similar circuit energizes solenoid $SS_2$, which actuates pinch roller PR–B, feeding tape from storage $S_1$ to storage $S_2$. When all the material has been fed out of storage $S_1$, and into storage $S_2$, tension switch TT–1 is opened by the taut tape, and the review operation is complete.

If, on review, the material is found unsatisfactory, reject switch RJ is closed, which energizes relay $R_2$ and solenoid $SS_3$, from + terminal $V_3$ via now closed tension switch $TT_2$. That switch is closed because tape has been fed into storage $S_2$ during review and is thus not taut. Relay $R_2$ locks itself in from + terminal $V_4$. When the tape in storage $S_2$ is exhausted, the tape becomes taut and opens switch $TT_2$, de-energizing solenoid $SS_3$ and terminating the review operation. The tape originally in storage $S_2$ is now ready for re-use.

If the material transferred to storage $S_2$ is found satisfactory, on review, master switch MS is closed, which energizes solenoid $SS_3$ and $SS_4$, from + terminal $V_5$ to lead $L_1$, and thence through solenoids $SS_3$ and $SS_4$ and through relay $R_3$, to lead $L_2$, which proceeds to ground via tension switch $TT_2$. The relay $R_3$ pulls in and closes contacts $CC_3$ and $CC_4$. Relay $R_3$ now locks in and solenoid $SS_4$ energizes, by virtue of a circuit from + terminal $V_6$, contacts $CC_3$, to relay $R_3$ and ground lead $L_2$, and also to solenoid $SS_4$ and ground lead $L_2$. Power for solenoid $SS_3$ is supplied from terminal $V_6$, via contacts $CC_4$. Closure of switch MS, accordingly, causes pinch rollers PR–C and PR–D to actuate, feeding tape $T_1$ out of storage $S_2$ and also feeding tape $T_2$. The connection from reproduce head P–2 to record head R–M enables transfer of information on the tape $T_1$ located in storage $S_2$ to the tape $T_2$, as the tape $T_1$ feeds out of storage $S_2$. The process is automatically terminated when tension switch $TT_2$ is opened, on exhaustion of storage $S_2$.

Counters C can be arranged to be driven by each pinch roller, or by selected pinch rollers, to enable accurate resetting of tapes at the rollers, where these may overshoot. For example, each counter may count quarter inches of tape. In feeding tape through PR–A, if reaction time of the operator is slow and bin $S_1$ of tape overruns, it can be readily and accurately fed back by hand, by reference to its counter. Likewise, compensation for spacings of pinch rollers, as PR–A, PR–B, can be readily effected, if necessary, by moving the tape manually while watching the counter.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A tape recording system, comprising a first capstan, a second capstan, first and second pinch rollers in operative relation to said first capstan, third and fourth pinch rollers in operative relation to said second capstan, a single drive motor for said first and second capstans, a first record head immediately preceding said first capstan, a first reproduce head immediately preceding said third pinch roller, a second reproduce head immediately preceding said fourth pinch roller, a second record head immediately preceding said second pinch roller, a first endless tape threaded in a path including said first, third and fourth pinch rollers in order, and a second tape drivable by said second pinch roller, and means for transferring signal from said second reproduce head to said second record head.

2. The combination according to claim 1 wherein is provided means for transferring signal from said second reproduce head to said first record head.

3. The combination according to claim 2 wherein is provided a first tape storage between said first record head and said first reproduce head, and a second tape storage between said first reproduce head and said second reproduce head.

4. A tape recording system, comprising in the recited order a first record head, a first tape drive including a capstan, a first tape storage,
a first reproduce head,
a second tape drive,
a second tape storage,
a second reproduce head,
a third tape drive,
and endless magnetic tape proceeding from said first record head to said first reproduce head, thence to said second reproduce head and thence to said first record head,
means for actuating said tape drives to drive said tape in one sense only,
wherein is provided means actuating said taped drives individually at will,
wherein is provided means responsive to emptying of said first storage for disabling said second tape drive, and
means responsive to emptying of said second tape storage for disabling said third tape drive, and
wherein is further provided a tape recorder having a further tape drive including said capstan and a furtheir record head for recording on said further tape, and
means for at will transferring signal from said third reproduce head to said further record head.

5. In a system for recording on a single endless tape,
a first tape feed,
a second tape feed,
a third tape feed,
means for actuating said tape feeds each independently of the others,
a first tape storage intermediate said first and second tape feeds,
a second tape storage intermediate said second and third tape feeds,
a record head located adjacent said first tape feed,
a first reproduce head adjacent said second tape feed, a second reproduce head adjacent said third tape feed,
means imposing a return of said tape directly from said second tape storage to said first tape storage,
wherein said first tape feed comprises a first capstan and a pinch roller,
wherein said second and third tape feeds comprise a further capstan and a pair of further pinch rollers common to said further capstan and located on opposite sides of said further capstan,
said further capstan and one of said further pinch rollers being arranged to feed said tape into said second tape storage,
said further capstan and the other of said further pinch rollers being arranged to abstract said tape from said second tape storage,
wherein is provided a further tape recorder for recording on a second tape, said further tape recorder including a further tape feed including said first capstan and a further record head, and
means for at will transferring signal from said second reproduce head to said further record head.

UNITED STATES PATENTS

References Cited

| | | | |
|---|---|---|---|
| 2,989,594 | 6/1961 | McKaig | 179—100.2 |
| 3,028,454 | 4/1962 | Von Kohorn | 179—100.2 |
| 3,041,417 | 6/1962 | Stroud | 179—100.2 |
| 3,107,347 | 10/1963 | Huss | 340—174.1 |
| 3,109,898 | 11/1963 | Gray | 179—100.2 |
| 3,155,778 | 11/1964 | Meyer | 179—100.2 |
| 3,298,006 | 1/1967 | Milenkouic et al. | 179—100.2 |

BERNARD KONICK, *Primary Examiner.*

L. G. KURLAND, J. R. GOUDEAU, *Assistant Examiners.*